(12) United States Patent
Yamamura et al.

(10) Patent No.: US 9,407,919 B2
(45) Date of Patent: Aug. 2, 2016

(54) IMAGE CODING APPARATUS

(71) Applicant: MegaChips Corporation, Osaka-shi (JP)

(72) Inventors: Naotsugu Yamamura, Osaka (JP); Akira Okamoto, Osaka (JP); Makoto Saito, Osaka (JP); Takuya Hiraoka, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/624,598

(22) Filed: Feb. 18, 2015

(65) Prior Publication Data

US 2015/0163495 A1 Jun. 11, 2015

Related U.S. Application Data

(63) Continuation of application No. 14/001,980, filed as application No. PCT/JP2012/054526 on Feb. 24, 2012, now Pat. No. 9,031,341.

(30) Foreign Application Priority Data

Feb. 28, 2011 (JP) .................................. 2011-041798

(51) Int. Cl.
*G06K 9/46* (2006.01)
*H04N 19/142* (2014.01)
(Continued)

(52) U.S. Cl.
CPC .............. *H04N 19/142* (2014.11); *G06T 9/007* (2013.01); *H04N 19/124* (2014.11);
(Continued)

(58) Field of Classification Search
None
See application file for complete search history.

(56) References Cited

U.S. PATENT DOCUMENTS 6,628,713 B1 * 9/2003 Kojima ................ H04N 19/142
348/699
8,363,727 B2 1/2013 Wang et al.
(Continued)

FOREIGN PATENT DOCUMENTS

JP 4-177991 6/1992
JP 8-317387 11/1996
(Continued)

OTHER PUBLICATIONS

Office Action issued Apr. 12, 2016 in Japanese Patent Application No. 2013-502282 (with English language translation).
(Continued)

*Primary Examiner* — Daniel Mariam
(74) *Attorney, Agent, or Firm* — Oblon, McClelland, Maier & Neustadt, L.L.P

(57) ABSTRACT

In an image coding apparatus (1), a Hadamard transform unit (11) performs horizontal Hadamard transform on a picture of uncompressed image data (21). The sum total of absolute values of AC component values obtained by the Hadamard transform is calculated as a Hadamard value (23) of the picture. A scene change determination unit (12) determines whether a scene change occurs or not in the picture on the basis of the Hadamard value (23). In a case where a scene change occurs in the picture or where a differential absolute value between the amount of generated codes in a coded GOP and the ideal amount of codes in a GOP is larger than a predetermined reference value, a quantization parameter determination unit (13) determines a quantization parameter (24) of the picture on the basis of the Hadamard value (23) and the target amount of codes of the picture. A coding unit (14) codes the picture by using the determined quantization parameter (24).

15 Claims, 10 Drawing Sheets

(51) Int. Cl.
  *G06T 9/00* (2006.01)
  *H04N 19/149* (2014.01)
  *H04N 19/15* (2014.01)
  *H04N 19/61* (2014.01)
  *H04N 19/126* (2014.01)
  *H04N 19/177* (2014.01)
  *H04N 19/124* (2014.01)
  *H04N 19/172* (2014.01)
  *H04N 19/60* (2014.01)

(52) U.S. Cl.
  CPC .......... *H04N 19/126* (2014.11); *H04N 19/149* (2014.11); *H04N 19/15* (2014.11); *H04N 19/172* (2014.11); *H04N 19/177* (2014.11); *H04N 19/60* (2014.11); *H04N 19/61* (2014.11)

(56) References Cited

U.S. PATENT DOCUMENTS

| | | |
|---|---|---|
| 8,625,924 B2 | 1/2014 | Tanaka et al. |
| 2009/0237569 A1 | 9/2009 | Saito et al. |

FOREIGN PATENT DOCUMENTS

| | | |
|---|---|---|
| JP | 2007-318617 | 12/2007 |
| JP | 2007-318817 | 12/2007 |
| JP | 2009-044483 | 2/2009 |
| JP | 2009-232148 | 10/2009 |

OTHER PUBLICATIONS

International Search Report issued Apr. 17, 2012 in PCT/JP2012/054526.

"Test Model 5" ISO/IEC JTC1/SC29/WG11, Apr. 1993, 36 Pages.

* cited by examiner

IMAGE CODING APPARATUS

CROSS-REFERENCE TO RELATED APPLICATIONS

This application is a continuation of U.S. Ser. No. 14/001,980 filed Aug. 28, 2013, the entire content of which is incorporated herein by reference. U.S. Ser. No. 14/001,980 is a National Stage of PCT/JP2012/054526 filed Feb. 24, 2012, which claims priority under 35 U.S.C. 119 to Japanese Application No. 2011-041798 filed Feb. 28, 2011.

TECHNICAL FIELD

The present invention relates to an image coding apparatus, and more particularly to an image coding apparatus for coding inputted image data by using a characteristic value indicating the complexity of the image data.

BACKGROUND ART

Image coding apparatuses record image data to be broadcasted via digital broadcasting or the like into recording media such as DVDs or the like by using image coding techniques such as MPEG2, H.264, or the like. The image coding apparatuses perform a code amount control process on the basis of recording conditions such as capacity of recording media, recording time, or the like.

Non-Patent Document 1 shows TM5 (Test Model 5) which is one of code amount control methods. The TM5 is a technique proposed in the process of standardization of MPEG2 coding scheme.

The TM5 performs the code amount control by using a characteristic value of image data, which is referred to as activity. The activity is a characteristic value indicating the complexity of an image. The activity of a macroblock, for example, is calculated by the following procedure. A differential absolute value between a pixel value of each of pixels in a macroblock and an average pixel value of the pixels in the macroblock is calculated, and then a sum total of the differential absolute values of all the pixels in the macroblock is calculated as the activity of the macroblock.

Patent Document 1 discloses a technique for detecting a scene change on the basis of the activity of image data.

PRIOR-ART DOCUMENTS

Patent Documents

[Patent Document 1] Japanese Patent Application Laid Open Gazette No. 2009-232148.
[Non-Patent Document 1] "Test Model 5", ISO/IEC JTC1/SC29/WG11, April, 1993.

The activity is a parameter used for determining coding conditions of image data, such as code amount control, detection of scene change, or the like. Using the activity as the complexity of image data, however, sometimes causes a failure in selection of an appropriate coding condition. In a case where an appropriate coding condition is not selected, there is a possibility that a bit rate of coded image data may be largely different from a target bit rate which is set in advance or the image quality of the coded image data may be degraded.

DISCLOSURE OF INVENTION

The present invention is intended for an image coding apparatus for coding uncompressed image data on a picture-by-picture basis. According to the present invention, the image coding apparatus comprises a Hadamard transform unit configured to calculate a characteristic value of a first picture by performing Hadamard transform on the first picture to generate frequency component data and summing absolute values of AC component values included in the frequency component data, and a coding unit configured to code the first picture by using the characteristic value as a parameter indicating the complexity of the first picture.

Since the characteristic value includes a frequency component of a picture, by using the characteristic value to code the first picture, it is possible to select an appropriate coding condition of image data.

According to the present invention, the image coding apparatus further comprises a code amount calculation unit configured to calculate target amount of picture codes which is a target value of the amount of codes to be generated by coding the first picture, and a first quantization parameter determination unit configured to determine a quantization parameter to be used for coding of the first picture on the basis of the characteristic value and the target amount of picture codes, and in the image coding apparatus of the present invention, the coding unit codes the first picture by using the quantization parameter.

Since the characteristic value includes a frequency component, by determining the quantization parameter of the first picture on the basis of the characteristic value, it is possible to increase the accuracy of the code amount control.

According to the present invention, the image coding apparatus further comprises a scene change determination unit configured to determine that a scene change occurs in the first picture when a differential absolute value between the characteristic value of the first picture and a characteristic value of a coded leading picture which is closest to the first picture among leading pictures of image groups each of which is constituted of a plurality of pictures is larger than a first threshold value.

Since the characteristic value includes a frequency component of a picture, it is possible to determine whether a scene change occurs or not in consideration of the variation in the frequency components among the pictures.

According to the present invention, the image coding apparatus further comprises a first difference calculation unit configured to calculate a first differential absolute value between a quantization parameter of the first picture and a quantization parameter of a first leading picture, the first leading picture being a coded leading picture which is closest to the first picture among leading pictures of image groups each of which is constituted of a plurality of pictures, a second difference calculation unit configured to calculate a second differential absolute value between a quantization parameter of each of second leading pictures and a quantization parameter of a coded leading picture positioned immediately before each of the second leading pictures, the second leading pictures being a predetermined number of coded leading pictures starting from the first picture, and a correction unit configured to correct the quantization parameter of the first picture so that a total value of the first differential absolute value and all second differential absolute values is not larger than a predetermined value.

Since repeated increase and decrease of the quantization parameter is prevented, it is possible to increase the image quality of the coded image data.

Therefore, it is an object of the present invention to provide a technique for appropriately selecting a coding condition of image data.

These and other objects, features, aspects and advantages of the present invention will become more apparent from the following detailed description of the present invention when taken in conjunction with the accompanying drawings.

BEST MODE FOR CARRYING OUT THE INVENTION

Hereinafter, with reference to figures, the preferred embodiments of the present invention will be discussed.

The First Preferred Embodiment

1. Overall Configuration

Figure 1:
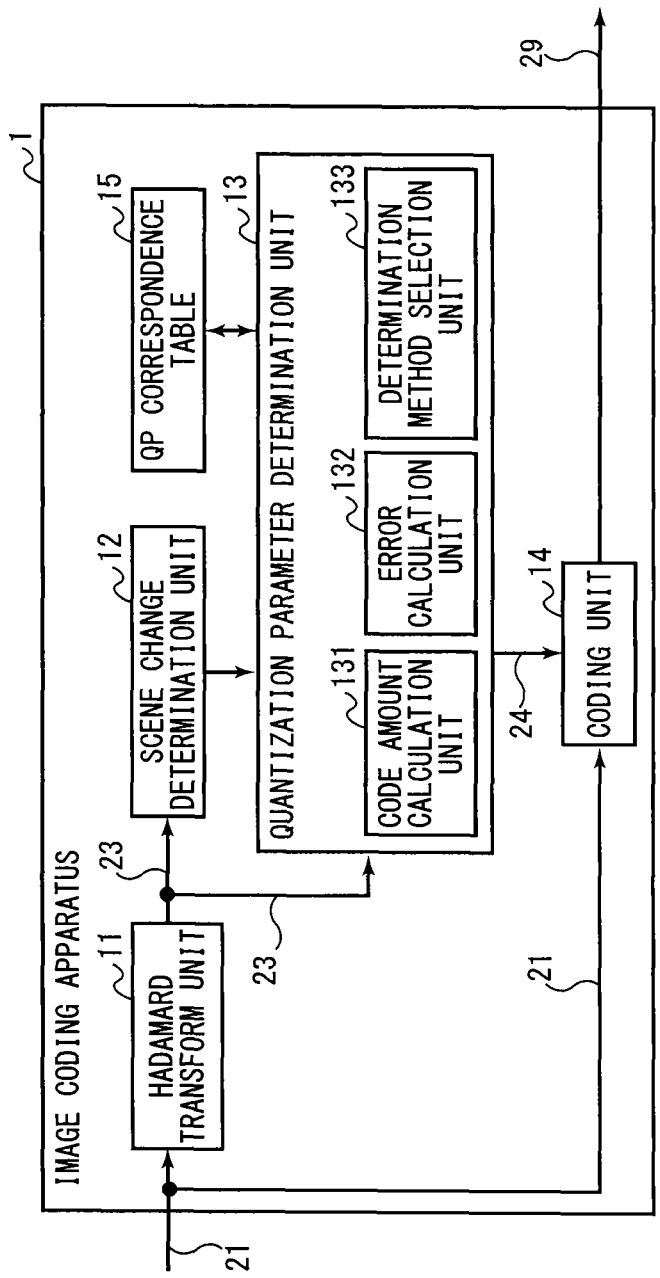
FIG. 1 is a functional block diagram showing a constitution of an image coding apparatus in accordance with a first preferred embodiment of the present invention.

FIG. 1 is a block diagram showing a functional constitution of an image coding apparatus 1 in accordance with the first preferred embodiment of the present invention. The image coding apparatus 1 codes uncompressed image data 21 in accordance with H.264 coding scheme and outputs H.264 data 29. The image coding apparatus 1 comprises a Hadamard transform unit 11, a scene change determination unit 12, a quantization parameter determination unit 13, a coding unit 14, and a QP correspondence table 15.

Figure 3:
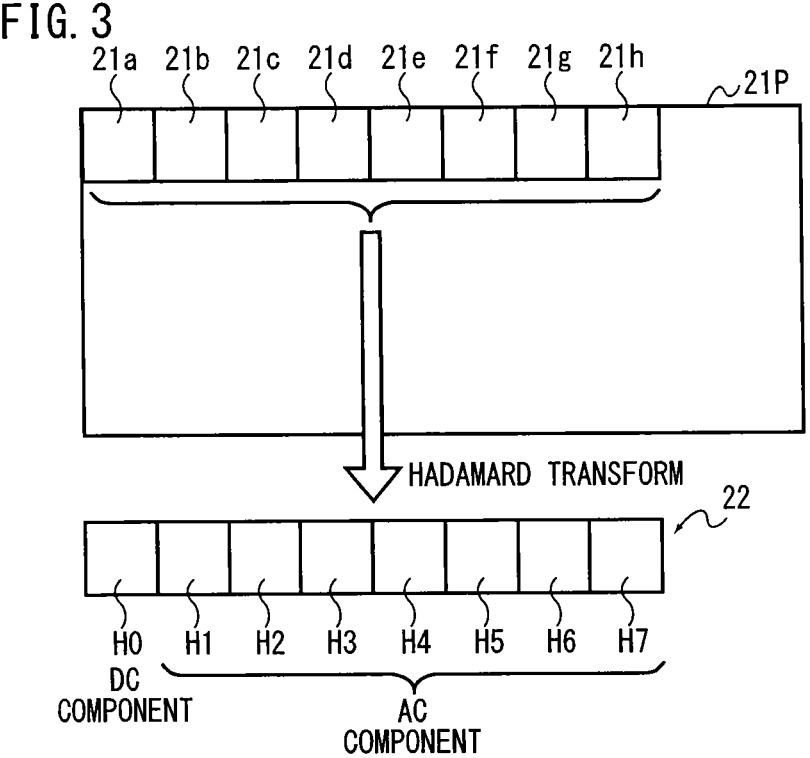
FIG. 3 is a view showing a procedure for calculating a Hadamard value, which is performed by a Hadamard transform unit shown FIG. 1.

The Hadamard transform unit 11 performs Hadamard transform on the uncompressed image data 21 which is moving image data, to thereby generate frequency component data 22 (see FIG. 3). The Hadamard transform unit 11 adds an AC component value included in the frequency component data 22, to thereby generate a Hadamard value 23. Since the Hadamard value 23 is calculated for each of pictures in the uncompressed image data 21, the Hadamard value 23 corresponds to each picture in the H.264 data 29.

The scene change determination unit 12 determines whether a scene change occurs or not in a current picture by using the Hadamard value 23 for each picture and the amount of generated codes in a GOP (Group of Picture). The current picture is a picture to be coded.

The quantization parameter determination unit 13 determines a quantization parameter 24 of the current picture on the basis of the Hadamard value 23 of the current picture, the target amount of picture codes, and the QP correspondence table 15. The target amount of picture codes is a target value of the amount of codes to be generated in coding of the current picture. The QP correspondence table 15 is a table in which the quantization parameter 24 corresponding to both the Hadamard value 23 and the target amount of picture codes is set.

The quantization parameter determination unit 13 comprises a code amount calculation unit 131, an error calculation unit 132, and a determination method selection unit 133.

The code amount calculation unit 131 calculates the ideal amount of GOP codes, the target amount of GOP codes, and the target amount of picture codes. The ideal amount of GOP codes is an ideal value of the amount of codes in the H.264 data 29 on a GOP-by-GOP basis and is calculated on the basis of a target bit rate which is set prior to the coding. The target amount of GOP codes is a value obtained by adjusting the ideal amount of GOP codes on the basis of the amount of generated GOP codes. The amount of generated GOP codes is the amount of codes in the H.264 data 29 on a GOP-by-GOP basis.

The error calculation unit 132 calculates a total error and a time period error on the basis of the ideal amount of GOP codes and the amount of generated GOP codes. The total error and the time period error are used for calculation of the target amount of picture codes. The total error and the time period error will be described later in detail.

The determination method selection unit 133 selects a method of determining the quantization parameter 24 of the current picture out of the following two methods. The first method is a method in which the quantization parameter is determined by using the Hadamard value 23 of the current picture. The second method is a method in which the quantization parameter 24 of an I (Intra) picture which is coded immediately before is determined as the quantization parameter 24 of the current picture.

The coding unit 14 inputs therein the uncompressed image data 21. The coding unit 14 codes the current picture by using the quantization parameter 24 of the current picture, to thereby generate the H.264 data 29.

2. Overview of Operation

The image coding apparatus 1 performs Hadamard transform on the current picture, to thereby generate the frequency component data 22. The sum total of the AC component values of the frequency component data 22 is obtained as the Hadamard value 23. The image coding apparatus 1 uses the Hadamard value 23 as a characteristic value indicating the complexity of an image in a picture in order to determine a coding condition of the current picture. The complexity indicates the degree of variation in pixel values of pixels included in the picture. The Hadamard value 23 includes a frequency component of the picture. For this reason, in a case where the Hadamard value 23 is used as the characteristic value indicating the complexity of the image, it is possible to code the picture in consideration of variation in the frequency component of the picture. Therefore, it is possible to determine the coding condition of the picture with high accuracy.

The image coding apparatus 1 determine whether a scene change occurs or not in the current picture by using the Hadamard value 23. The image coding apparatus 1 can determine whether a scene change occurs or not in consideration of the variation in the frequency components among pictures. Therefore, it is possible to increase the detection accuracy of the scene change.

The image coding apparatus 1 determines the quantization parameter 24 on the basis of the Hadamard value 23 of the current picture. Since the correlation between the Hadamard value 23 and the amount of generated codes in the picture is higher as compared with the activity, it is possible to increase the accuracy of the code amount control.

3. Operation Flow of Coding Process

Figure 2:
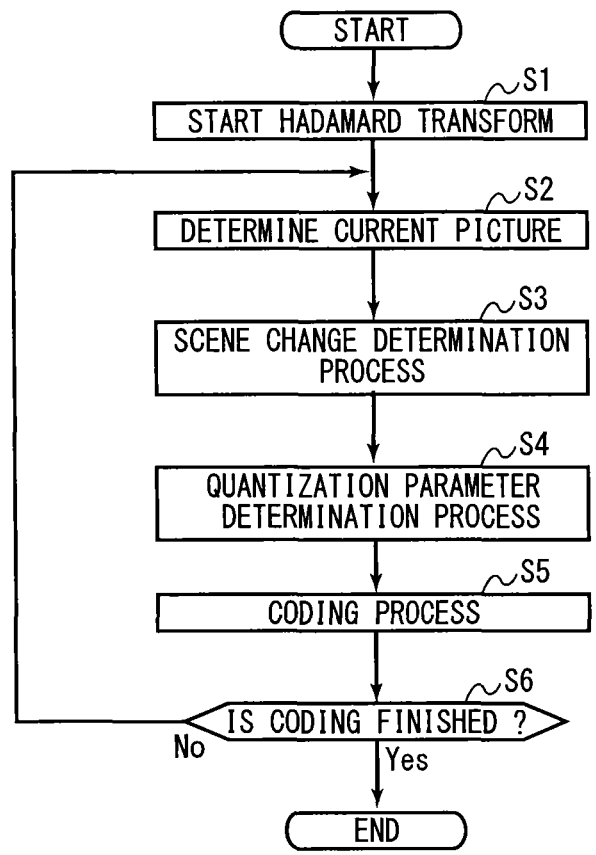
FIG. 2 is a flowchart of a coding process performed by the image coding apparatus shown in FIG. 1.

Hereinafter, detailed discussion will be made on an operation of the image coding apparatus 1. FIG. 2 is a flowchart of a coding process performed by the image coding apparatus 1.

First, the code amount calculation unit 131 calculates the ideal amount of GOP codes. The ideal amount of GOP codes is calculated on the basis of a frame rate of the H.264 data 29, a target bit rate of the H.264 data 29, and the number of pictures per GOP.

In the image coding apparatus 1, the Hadamard transform unit 11 starts calculation of the Hadamard value 23 for each of the pictures in the uncompressed image data 21 (Step S1). The Hadamard transform unit 11 calculates the Hadamard value 23 for each picture concurrently with the processes in Steps S2 to S6 discussed later.

The image coding apparatus 1 determines a picture to be coded (current picture) (Step S2). The scene change determination unit 12 determines whether a scene change occurs or not in the current picture on the basis of the Hadamard value 23 of the current picture (Step S3).

The quantization parameter determination unit 13 determines the quantization parameter 24 of the current picture on the basis of the determination result on the scene change (Step S4). When a scene change occurs in the current picture, the quantization parameter determination unit 13 determines the quantization parameter 24 of the current picture on the basis of the Hadamard value 23 of the current picture.

The coding unit 14 codes the current picture by using the quantization parameter determined by the quantization parameter determination unit 13 (Step S5). After coding of the current picture, the image coding apparatus 1 determines whether to finish the coding process on the uncompressed image data 21 (Step S6). If the coding process should be finished ("Yes" in Step S6), the image coding apparatus 1 ends the operation shown in FIG. 2. If the coding process should not be finished ("No" in Step S6), the image coding apparatus 1 repeats the operation of Steps S2 to S5.

3.1. Calculation of Hadamard Value

Detailed discussion will be made on calculation of the Hadamard value. The Hadamard transform unit 11 calculates the Hadamard value 23 of each picture concurrently with the determination of the quantization parameter (Step S4) and the coding of the picture (Step S5).

FIG. 3 is a schematic view showing an operation flow for calculating the Hadamard value 23. A picture 21P is a picture in the uncompressed image data 21 and original image data which has not been subjected to a preprocessing such as a prediction process or the like. In FIG. 3, the size of each of pixels 21a to 21h is exaggerated. The Hadamard transform unit 11 performs Hadamard transform on respective pixel values of the eight pixels 21a to 21h arranged in a horizontal direction, to thereby generate the frequency component data 22 including a DC component H0 and AC components H1 to H7. Thus, the Hadamard transform unit 11 performs Hadamard transform on each pixel in the picture 21P in units of eight pixels in the horizontal direction. The coding unit 14 does not use the frequency component data 22 in order to code the current picture. The coding unit 14 performs Hadamard transform, independently of the Hadamard transform unit 11, in order to code the current picture.

A sum of absolute values of all the AC components obtained by the horizontal Hadamard transform is obtained as the Hadamard value 23. In other words, the Hadamard value 23 is a total value of the absolute values of all the AC components obtained by performing Hadamard transform on all the pixels in the picture in units of eight pixels, and is calculated on a picture-by-picture basis. The Hadamard transform unit 11 outputs the Hadamard value 23 to the scene change determination unit 12 and the quantization parameter determination unit 13. Since the Hadamard value 23 can be obtained without performing any Hadamard transform in a vertical direction, it is possible to reduce the amount of computation in the calculation of the Hadamard value 23.

3.2. Scene Change Determination Process (Step S3)

Hereinafter, detailed discussion will be made on a scene change determination process (Step S3, see FIG. 2).

Figure 4:
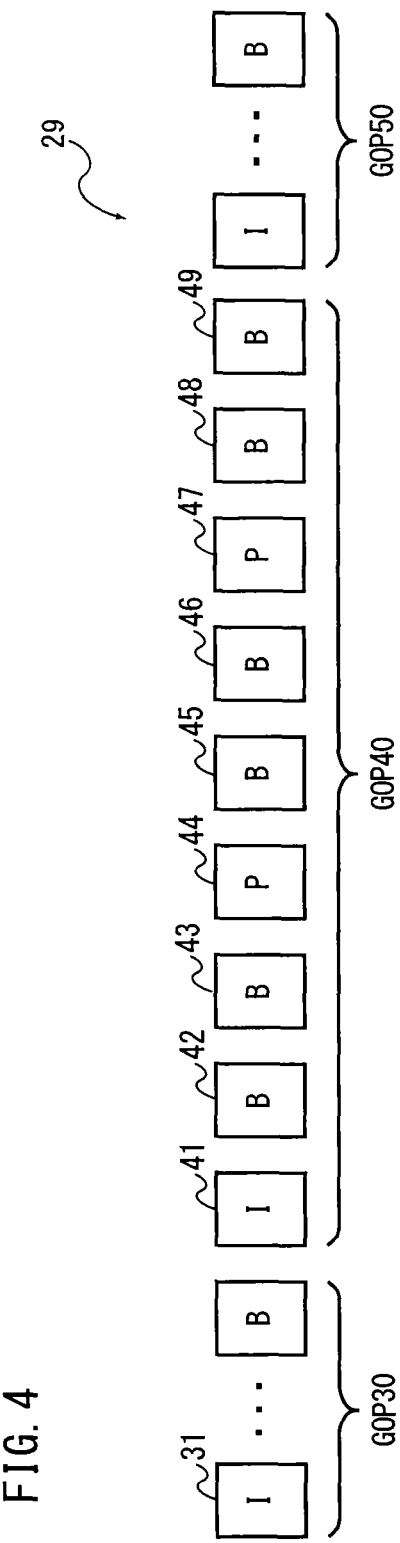
FIG. 4 is a view showing an arrangement of pictures in H.264 data shown in FIG. 1.

FIG. 4 is a view showing an arrangement of pictures in the H.264 data 29. In FIG. 4, "I" represents an I picture, "B" represents a B (Bi-Directional Predictive) picture, and "P" represents a P (Predictive) picture. Hereinafter, the I picture, the P picture, and the B picture will be sometimes generally referred to simply as a "picture". In FIG. 4, GOPs 30, 40, and 50 each have one I picture. The I picture is positioned at the beginning of each GOP.

Figure 5:
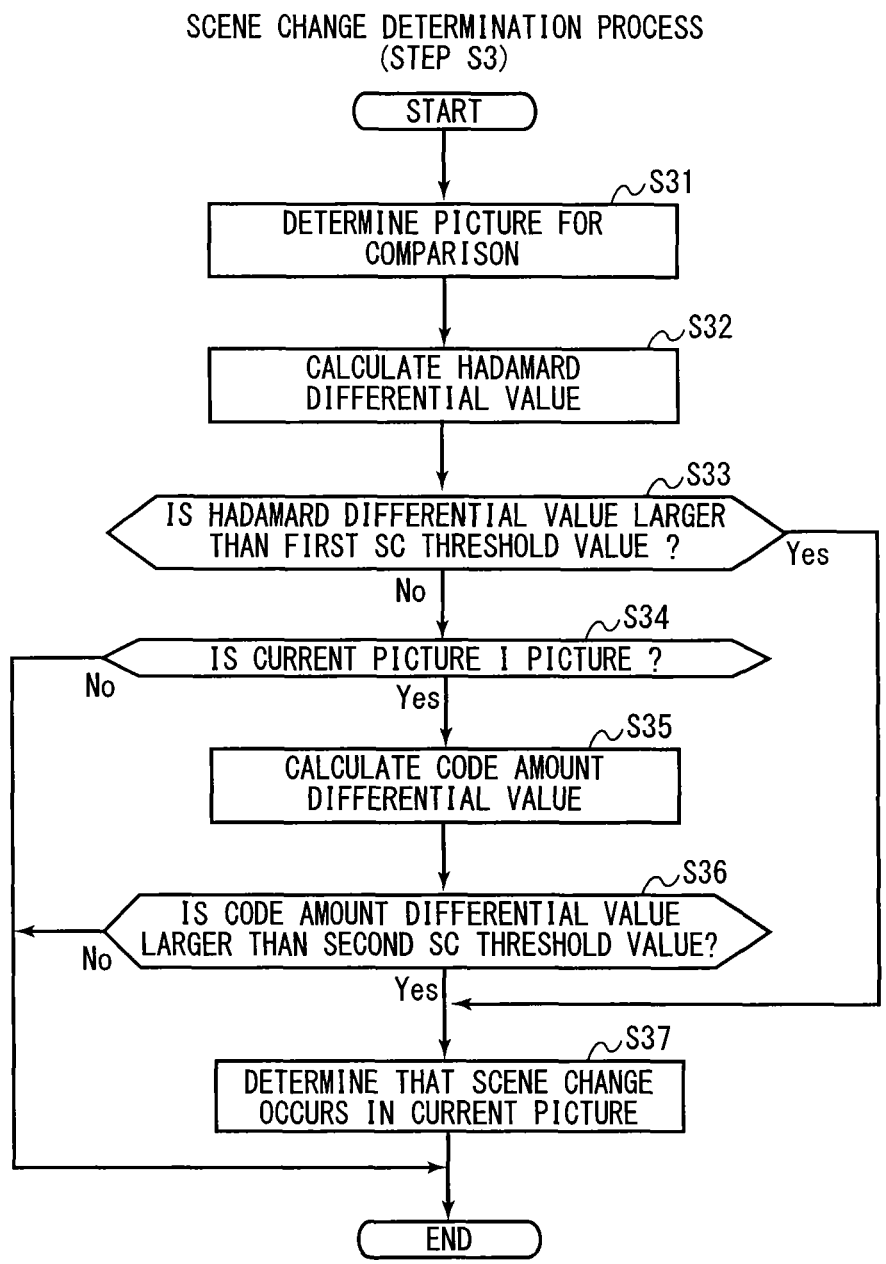
FIG. 5 is a flowchart of a scene change determination process shown in FIG. 2.

FIG. 5 is a flowchart of a scene change determination process (Step S3). The scene change determination unit 12 determines whether a scene change occurs or not from two criteria, i.e., the change of the Hadamard value 23 and the amount of generated GOP codes.

An operation flow of the scene change determination process will be discussed, taking a case, as an example, where the GOP 40 including pictures 41 to 49 is a GOP to be coded (current GOP).

The scene change determination unit 12 determines a picture (picture for comparison) to be compared with the current picture (Step S31). In a case where the P pictures 44 and 47 or the B pictures 42, 43, 45, 46, 48, and 49 are current pictures, the picture for comparison is a leading picture (I picture 41) of the GOP 40. In a case where the I picture 41 is a current picture, the picture for comparison is a leading picture (I picture 31) of the GOP 30 which is coded immediately before the GOP 40. In other words, the scene change determination unit 12 determines a coded I picture which is closest to the current picture as the picture for comparison.

First, the scene change determination unit 12 determines whether a scene change occurs or not on the basis of the change of the Hadamard value 23. The scene change determination unit 12 calculates a Hadamard differential value which is a differential absolute value between the Hadamard value 23 of the current picture and a Hadamard value 23 of the picture for comparison (Step S32). The scene change determination unit 12 compares the Hadamard differential value with a first SC (Scene Change) threshold value (Step S33).

The first SC threshold value is calculated by multiplying the Hadamard value 23 of the picture for comparison by a predetermined first SC coefficient. Since the picture for comparison is a leading picture (I picture) of a GOP, the first SC threshold value changes on a GOP-by-GOP basis. Further, the first SC threshold value may be a fixed value which is set prior to the coding of the uncompressed image data 21.

When the Hadamard differential value is larger than the first SC threshold value ("Yes" in Step S33), the scene change determination unit 12 determines that a scene change occurs in the current picture (Step S37). In other words, when the Hadamard value 23 of the current picture has changed by a value over the threshold value obtained from the Hadamard value 23 of the picture for comparison, the scene change determination unit 12 determines that a scene change occurs.

When the Hadamard differential value is not larger than the first SC threshold value ("No" in Step S33), the scene change determination unit 12 checks if the current picture is the I picture 41 (Step S34). When the current picture is not the I picture 41 ("No" in Step S34), the scene change determination unit 12 ends the operation of FIG. 5.

On the other hand, when the current picture is the I picture 41 ("Yes" in Step S34), the scene change determination unit 12 determines whether a scene change occurs or not by using the amount of generated codes in the GOP which is coded immediately before. Specifically, the scene change determination unit 12 calculates a code amount differential value (Step S35). The code amount differential value is a differential absolute value between the ideal amount of GOP codes and the amount of generated codes in the GOP 30 which is coded immediately before the GOP 40.

When the code amount differential value is larger than a second SC threshold value ("Yes" in Step S36), the scene change determination unit 12 determines that a scene change occurs in the current picture (I picture 41) (Step S37). The second SC threshold value is calculated by multiplying the ideal amount of GOP codes by a predetermined second SC coefficient indicating the determination criterion for the scene change. In other words, when a ratio of the code amount differential value to the ideal amount of GOP codes exceeds the threshold value obtained from the ideal amount of GOP codes, the scene change determination unit 12 determines that a scene change occurs in the current picture (I picture 41).

On the other hand, when the code amount differential value is not larger than the second SC threshold value ("No" in Step S36), the scene change determination unit 12 determines that no scene change occurs in the current picture and ends the operation of FIG. 5.

Thus, the scene change determination unit 12 determines whether a scene change occurs or not in the current picture by using the Hadamard differential value. Since the Hadamard value 23 is calculated by performing Hadamard transform on the picture, a frequency component of the picture is taken into consideration. In other words, since the scene change can be detected on the basis of a change of the frequency component between the current picture and the picture for comparison, it is possible to increase the determination accuracy of the scene change.

When the current picture is an I picture, the scene change determination unit 12 determines whether a scene change occurs or not on the basis of the ideal amount of GOP codes and the amount of generated codes in the GOP 30 which is coded immediately before the current GOP (GOP 40). Thus, since whether a scene change occurs or not is determined by using the two parameters, i.e., the Hadamard value 23 and the amount of generated codes in the GOP 30 which is coded immediately before the current picture, it is possible to increase the determination accuracy of the scene change.

Quantization Parameter Determination Process (Step S4)

Hereinafter, discussion will be made on a quantization parameter determination process (Step S4, see FIG. 2). Basically, the quantization parameter 24 of the coded I picture which is closest to the current picture is used as the quantization parameter 24 of the current picture. When a scene change occurs or when the difference between the ideal amount of GOP codes and the amount of generated codes in the coded GOP is larger than a selection reference value described later, however, the quantization parameter 24 of the current picture is determined on the basis of the Hadamard value 23 of the current picture.

Figure 6:
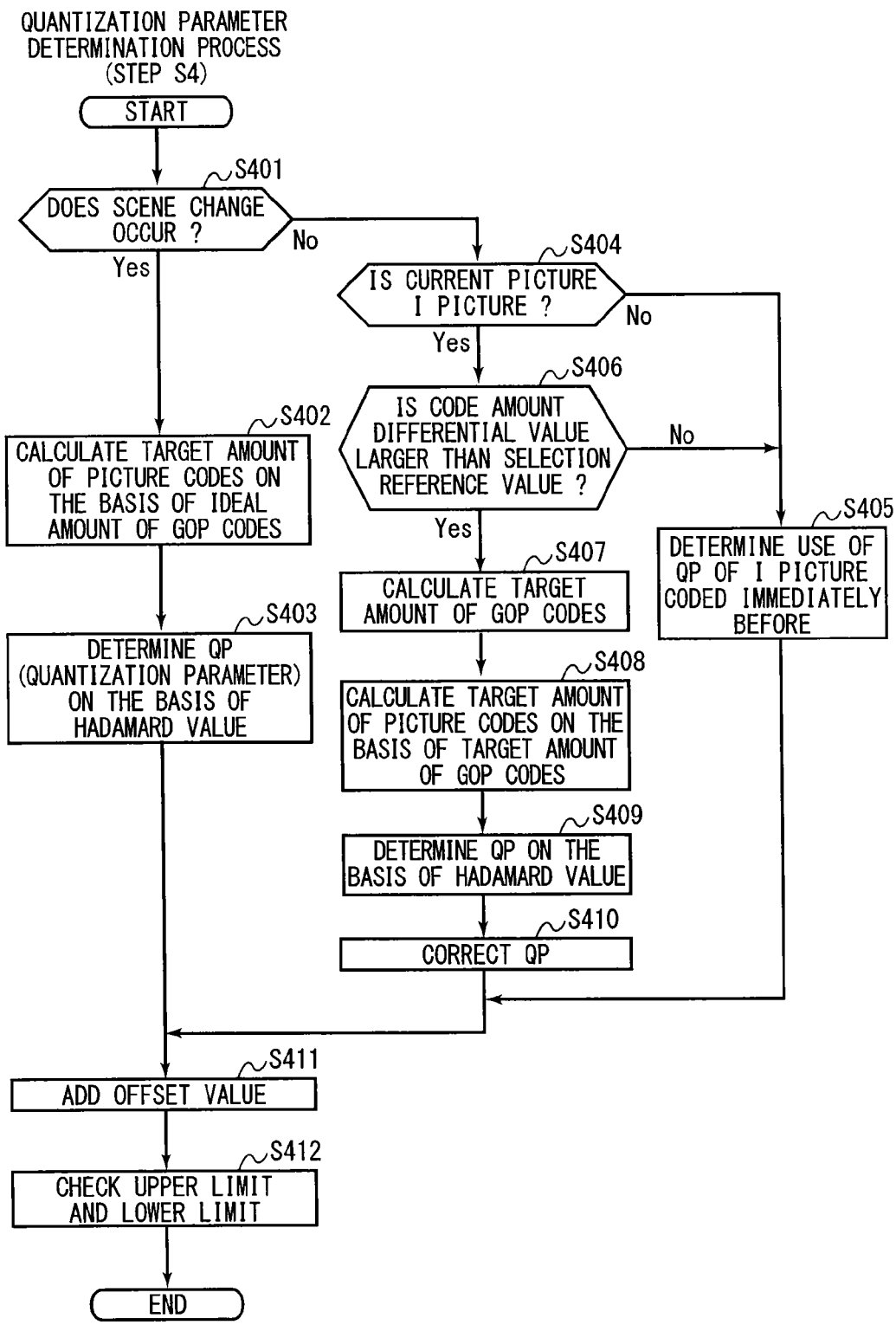
FIG. 6 is a flowchart of a quantization parameter determination process shown in FIG. 2.

FIG. 6 is a flowchart of a quantization parameter determination process (Step S4). The quantization parameter determination unit 13 checks if a scene change occurs in the current picture (Step S401).

When a scene change occurs in the current picture ("Yes" in Step S401), the quantization parameter determination unit 13 determines the quantization parameter 24 by using the Hadamard value 23 of the current picture, regardless of the picture type of the current picture.

The code amount calculation unit 131 calculates the target amount of picture codes of the current picture on the basis of the ideal amount of GOP codes (Step S402).

When a scene change occurs, it is not appropriate that the quantization parameter 24 of the coded I picture which is closest to the current picture is used as the quantization parameter 24 of the current picture. In order to reset the quantization parameter 24 of the current picture, the code amount calculation unit 131 calculates the target amount of picture codes, assuming the current picture to be an I picture. Adjustment of the quantization parameter 24 in accordance with the picture type is performed in Step S411 as discussed later. Specifically, the target amount of picture codes is calculated by multiplying the ideal amount of GOP codes by the I picture ratio, regardless of the picture type of the current picture. When the GOP 40 is the current GOP, the I picture ratio is calculated as a ratio of the amount of generated codes of the I picture 31 to the amount of generated codes in the GOP 30 which is positioned immediately before the GOP 40.

The quantization parameter determination unit 13 determines the quantization parameter 24 by using the Hadamard value 23 of the current picture, the target amount of picture codes, and the QP correspondence table 15 (Step S403). The QP correspondence table 15 is a two-dimensional table in which the quantization parameter corresponding to both the Hadamard value 23 and the target amount of picture codes is set. The quantization parameter determination unit 13 determines the quantization parameter 24 by referring to the QP correspondence table 15 with the Hadamard value 23 of the current picture and the target amount of picture codes as an input parameter.

In Step S403, it is preferable that the quantization parameter 24 should be determined by conversion of the Hadamard value 23 of the current picture and the target amount of picture codes into an average value per macroblock. In this case, the Hadamard value 23 and the target amount of picture codes per macroblock are set as an input parameter in the QP correspondence table 15. This eliminates the necessity of preparing a QP correspondence table 15 for each size of the picture.

Thus, when a scene change occurs ("Yes" in Step S401), the quantization parameter determination unit 13 determines the quantization parameter on the basis of the Hadamard value 23 and the target amount of picture codes regardless of the picture type. This is because there is a possibility that when a scene change occurs, the image quality may be degraded if the quantization parameter 24 of the coded I picture is set as the quantization parameter 24 of the current picture.

Back to the discussion of Step S401, when no scene change occurs in the current picture ("No" in Step S401), the quantization parameter determination unit 13 checks if the current picture is an I picture (Step S404). When the current picture is a P picture or a B picture ("No" in Step S404), the quantization parameter 24 of the coded I picture which is closest to the current picture is determined as the quantization parameter 24 of the current picture (Step S405). When the current picture is any one of pictures 42 to 49, the quantization parameter 24 of the I picture 41 is determined as the quantization parameter 24 of the current picture.

When the current picture is an I picture ("Yes" in Step S404), the quantization parameter determination unit 13 performs the process of Step S406. The determination method selection unit 133 selects the method of determining the quantization parameter 24 out of the first method and the second method on the basis of whether the code amount differential value exceeds the selection reference value or not (Step S406). The first method is a method in which the quantization parameter is determined on the basis of the Hadamard value 23 of the current picture. The second method is a method in which the quantization parameter is determined by using the quantization parameter 24 of the I picture coded immediately before. The code amount differential value is calculated as a differential absolute value between the ideal amount of GOP codes and the amount of generated codes in the GOP which is coded immediately before the current GOP, as discussed in Step S35 (see FIG. 5). The selection reference value will be discussed later.

Hereinafter, in the discussion of Steps S406 to S410, as an example, taken is a case where the I picture 41 is the current picture and the GOP 40 is the current GOP, unless otherwise noted.

The reason why the process in Step S406 should be performed will be discussed. When no scene change occurs in the I picture 41, as a general rule, the quantization parameter 24 of the leading picture (I picture 31) of the GOP 30 which is coded immediately before is set as the quantization parameter 24 of the I picture 41. Herein, considered is a case where a difference between the amount of generated codes in the GOP 30 and the ideal amount of GOP codes is not so large as to be determined that a scene change occurs in the I picture 41 but relatively large. In this case, there is a strong possibility that a difference between the amount of generated codes in the GOP 40 and the ideal amount of GOP codes may also become relatively large, like in the GOP 30, by setting the quantization parameter 24 of the leading picture of the GOP 30 as the quantization parameter 24 of the I picture 41. In order to avoid such a case, in Step S406, the quantization parameter determination unit 13 selects a method in which the quantization parameter 24 of the I picture 41 is determined on the basis of the code amount differential value.

Specifically, in Step S406, the quantization parameter determination unit 13 calculates the code amount differential value which is a differential absolute value between the ideal amount of GOP codes and the amount of generated codes in the GOP 30, like in Step S35 (see FIG. 5). The quantization parameter determination unit 13 checks if the code amount differential value exceeds the selection reference value. The selection reference value is a reference value used to determine whether to use the Hadamard value 23 in order to determine the quantization parameter 24, and is smaller than the second SC threshold value. The selection reference value is calculated by multiplying the ideal amount of GOP codes by a predetermined selection coefficient.

The selection coefficient is smaller than the second SC coefficient used for determining whether a scene change occurs or not. This is because the quantization parameter 24 of the I picture 41 is calculated on the basis of the Hadamard value 23 (Step S403) when a scene change occurs ("Yes" in Step S401), as discussed above.

When the code amount differential value is not larger than the selection reference value ("No" in Step S406), the determination method selection unit 133 selects a method in which the quantization parameter 24 of the coded I picture is used. As the quantization parameter 24 of the I picture 41, determined is the quantization parameter 24 of the coded I picture 31 which is closest to the I picture 41 (Step S405). This is because the difference between the amount of generated codes in the GOP 40 and the ideal amount of GOP codes does not increase even when the quantization parameter 24 of the I picture 31 is used for coding of the GOP 40.

On the other hand, when the code amount differential value is larger than the selection reference value ("Yes" in Step S406), the determination method selection unit 133 determines that the difference between the amount of generated codes in the GOP 30 and the ideal amount of GOP codes is relatively large. For this reason, selected is a method in which the quantization parameter 24 is determined on the basis of the Hadamard value 23. The code amount calculation unit 131 calculates the target amount of codes in the GOP 40 (target amount of GOP codes) (Step S407). In order to make the amount of generated codes on a GOP-by-GOP basis convergent on the ideal amount of GOP codes, the target amount of GOP codes is calculated on the basis of the ideal amount of GOP codes and the amount of generated codes in the coded GOP.

Discussion will be made on a procedure for calculating the target amount of GOP codes. First, the error calculation unit 132 calculates the total error accompanying the coding of the uncompressed image data 21 by using Eq. 1.

$$ET = \Sigma(Qg - Qd) \qquad \text{(Eq. 1)}$$

In Eq. 1, "ET" represents the total error, "Qd" represents the ideal amount of GOP codes, and "Qg" represents the amount of generated codes in the coded GOP. Specifically, the error calculation unit 132 calculates a value (individual error) by subtracting the ideal amount of GOP codes from the amount of generated codes in the coded GOP and sums the individual errors of all the coded GOPs, to thereby obtain the total error.

The error calculation unit 132 calculates the time period error by using Eq. 2.

$$Ep = \sum_{i=0}^{range} (Qg - Qd) \qquad \text{(Eq. 2)}$$

In Eq. 2, "Ep" represents the time period error and "range" represents the number of coded GOPs to be used for calculation of the time period error. Specifically, the error calculation unit 132 specifies a predetermined number of coded GOPs with the current GOP as a reference out of all the coded GOPs and calculates the time period error by summing the individual errors of the specified coded GOPs.

The error calculation unit 132 calculates the target amount of GOP codes by using Eq. 3.

$$Qa=Qd-(ET \cdot Ce)-(Ep \cdot Ce) \tag{Eq. 3}$$

In Eq. 3, "Qa" represents the target amount of GOP codes and "Ce" represents a coefficient not larger than 1, by which the total error and the time period error are multiplied, which is set prior to the coding of the uncompressed image data 21. Thus, the target amount of GOP codes is calculated on the basis of the ideal amount of GOP codes and the total error and the time period error.

Further, a lower limit value is set for the target amount of GOP codes. Though detailed discussion will be made later, the quantization parameter 24 of the I picture 41 is determined on the basis of the Hadamard value 23 and the target amount of picture codes calculated from the target amount of GOP codes. When the target amount of GOP codes is largely smaller than the ideal amount of GOP codes, it is thought that the quantization parameter 24 is determined to be an extremely high value. In this case, the image quality of the GOP 40 including I picture 41 is largely degraded. By setting the lower limit value for the target amount of GOP codes, however, it is possible to maintain the image quality of the H.264 data 29 at a certain level or higher.

After calculation of the target amount of GOP codes (Step S407), the code amount calculation unit 131 calculates the target amount of picture codes (Step S408). The target amount of picture codes is calculated by multiplying the target amount of GOP codes by the I picture ratio, like in Step S402. The quantization parameter determination unit 13 determines the quantization parameter 24 of the I picture 41 on the basis of the Hadamard value 23 of the I picture 41, the target amount of picture codes, and the QP correspondence table 15 (Step S409), like in St S403.

Thus, even when no scene change occurs in I picture 41, in a case where the amount of generated codes in the GOP 30 which is coded immediately before is largely different from the ideal amount of GOP codes, the quantization parameter 24 of the I picture 41 is determined on the basis of the Hadamard value 23. It is thereby possible to make the bit rate of the H.264 data 29 convergent on the target bit rate even when the amount of generated codes in the GOP 30 is largely different from the ideal amount of GOP codes.

After Step S409, the quantization parameter determination unit 13 corrects the quantization parameter 24 of the I picture 41 on the basis of the quantization parameter 24 of the coded I picture (Step S410). It is thereby possible to prevent the image quality of the H.264 data 29 from sharply changing.

Specifically, the quantization parameter determination unit 13 specifies the quantization parameters 24 of a predetermined number of (for example, three) coded I pictures with the GOP 40 as a reference. The quantization parameter determination unit 13 calculates a sum of absolute differences between the quantization parameter 24 of the I picture 41 and the quantization parameters 24 of the specified coded I pictures. When the calculated sum of absolute differences is larger than an upper limit change value which is set in advance, the quantization parameter 24 of the I picture 41 is corrected so that the sum of absolute differences should not be larger than the upper limit change value. Detailed discussion on Step S410 will be made in the second preferred embodiment.

Next, discussion will be made on Step S411. The process in Step S411 is performed after the quantization parameter 24 of the current picture is determined in Steps S403 and S405 and after the quantization parameter 24 of the current picture is corrected in Step S410. In Step S411, the quantization parameter 24 of the current picture which is determined any one of Steps S403, S405, and S410 is adjusted in accordance with the picture type of the current picture. The quantization parameter determination unit 13 adds an offset value in accordance with the picture type of the current picture to the quantization parameter 24 (Step S411). When the current picture is a P picture or a B picture, the offset value is set to be a value larger than 0. When the current picture is an I picture, the offset value is set to be 0. The offset value of the I picture, however, may be a value larger than 0.

The quantization parameter determination unit 13 checks if the quantization parameter 24 of the current picture exceeds an upper limit value which is set in advance or if the quantization parameter 24 of the current picture does not fall short of the lower limit value (Step S412). When the quantization parameter 24 exceeds the upper limit value, the quantization parameter 24 is set to be the upper limit value. When the quantization parameter 24 falls short of the lower limit value, the quantization parameter 24 is set to be the lower limit value. Thus, the quantization parameter 24 of the current picture is determined. The coding unit 14 codes the current picture by using the quantization parameter 24 determined by the quantization parameter determination unit 13 (Step S5, see FIG. 2).

Thus, the image coding apparatus 1 sets the quantization parameter 24 of the current picture on the basis of the Hadamard value 23 of the current picture. It is thereby possible to increase the accuracy of the code amount control in coding of the uncompressed image data 21. Hereinafter, the reason for this will be discussed.

Figure 7:
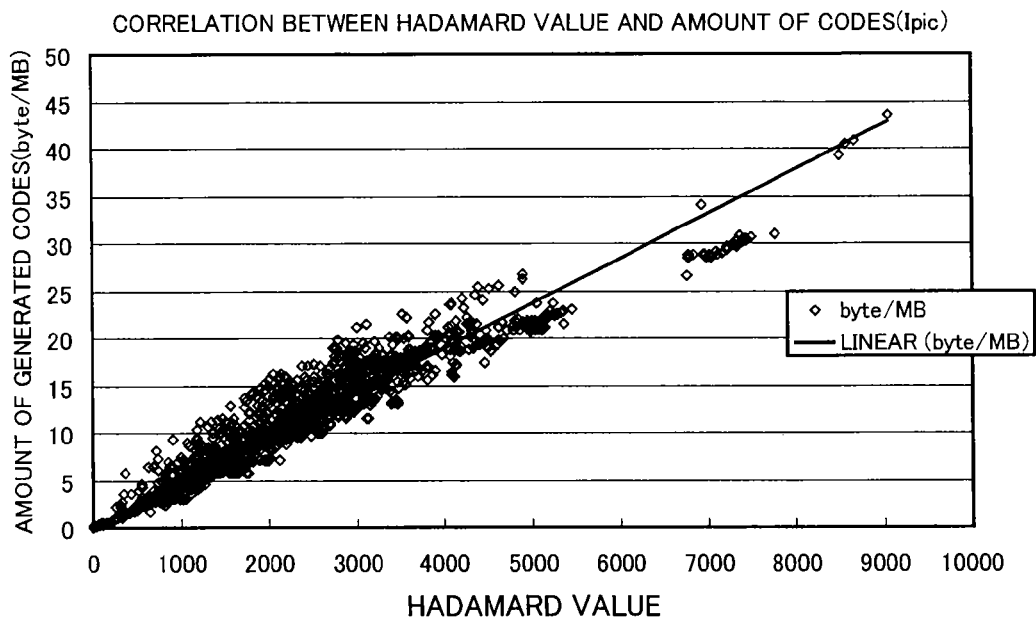
FIG. 7 is a view showing a correlation between the amount of codes and the Hadamard value in an intra picture in a case where the quantization parameter determination unit of FIG. 1 determines a quantization parameter.
Figure 8:
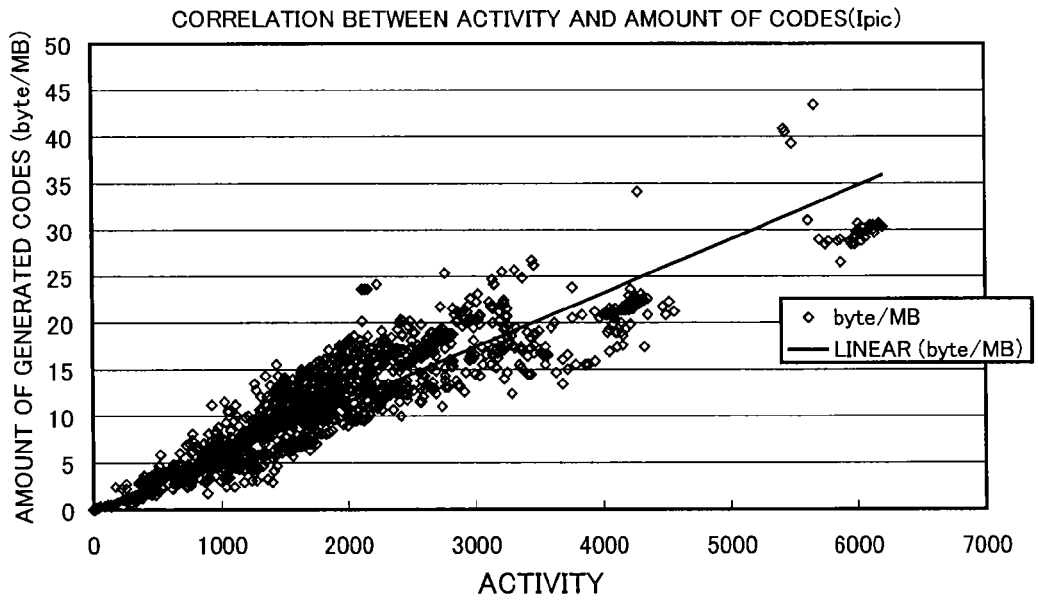
FIG. 8 is a view showing a correlation between the amount of codes and an activity in an intra picture in a case where the quantization parameter is determined on the basis of the activity of a picture.

FIG. 7 is a view showing a correlation between the amount of codes in the coded I picture and the Hadamard value of the coded I picture in a case where the quantization parameter of each picture is determined on the basis of the above-discussed procedure. FIG. 8 is a view showing a correlation between the amount of codes in the coded I picture and an activity of the coded I picture in a case where the quantization parameter of the I picture is determined on the basis of the activity. In FIGS. 7 and 8, the vertical axis represents the amount of codes per macroblock.

As shown in FIGS. 7 and 8, the variation in the amount of generated codes in the I picture is smaller in the case where the quantization parameter is determined by using the Hadamard value than in the case where the quantization parameter is determined by using the activity. Therefore, in the case where the quantization parameter of the I picture is determined by using the Hadamard value, since the variation in the amount of generated codes in the picture can be suppressed, it is possible to increase the accuracy of the code amount control.

The Second Preferred Embodiment

Figure 9:
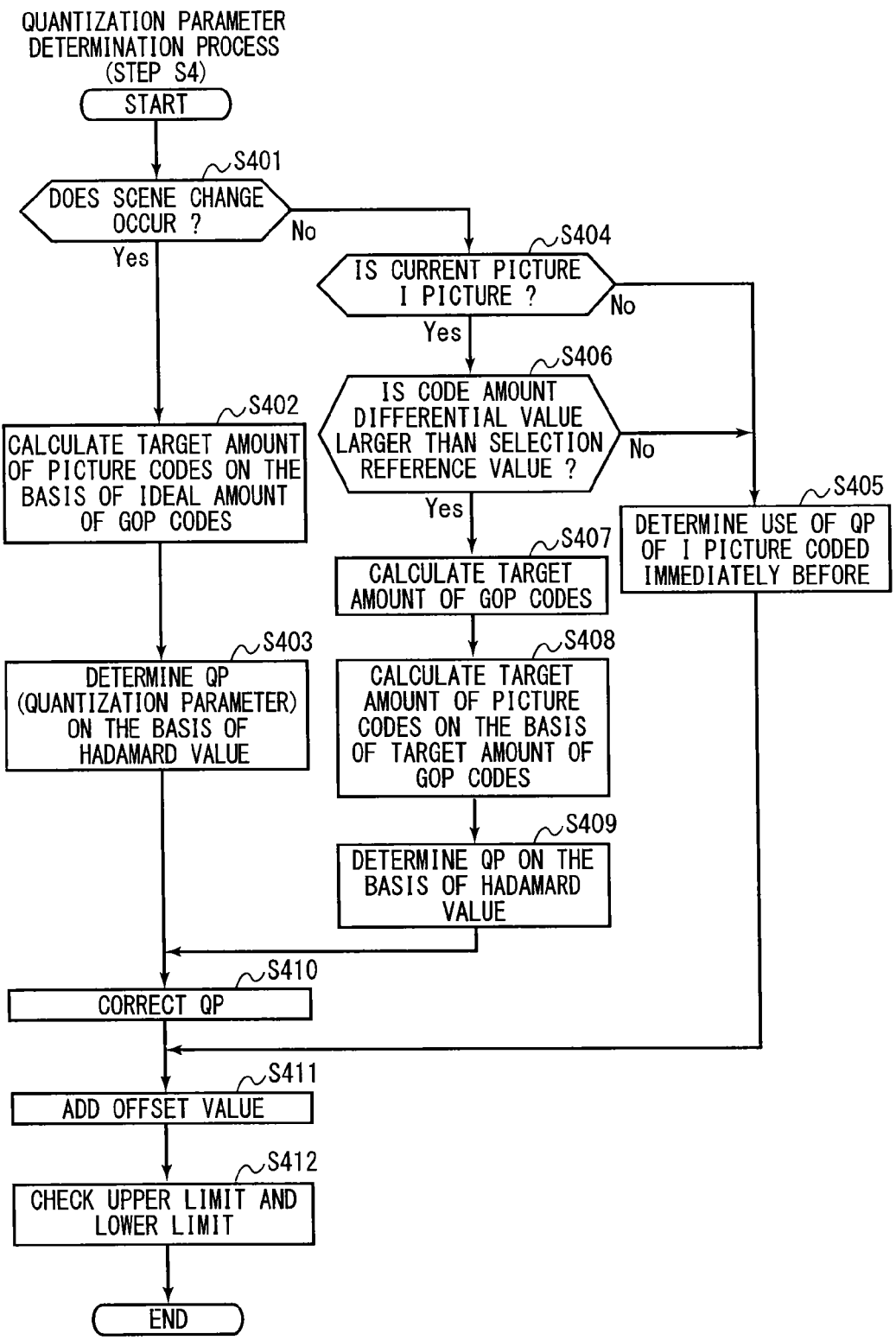
FIG. 9 is a flowchart of a quantization parameter determination process in accordance with a second preferred embodiment of the present invention.

Hereinafter, with reference to FIG. 9, the second preferred embodiment of the present invention will be discussed. FIG. 9 is a flowchart of a quantization parameter determination process (Step S4) in accordance with the second preferred embodiment of the present invention. The second preferred embodiment is difference from the first preferred embodiment in that a correction process (Step S410) of the quantization parameter 24 is performed even after the quantization parameter 24 of the current picture is determined in Step S403.

Figure 10:
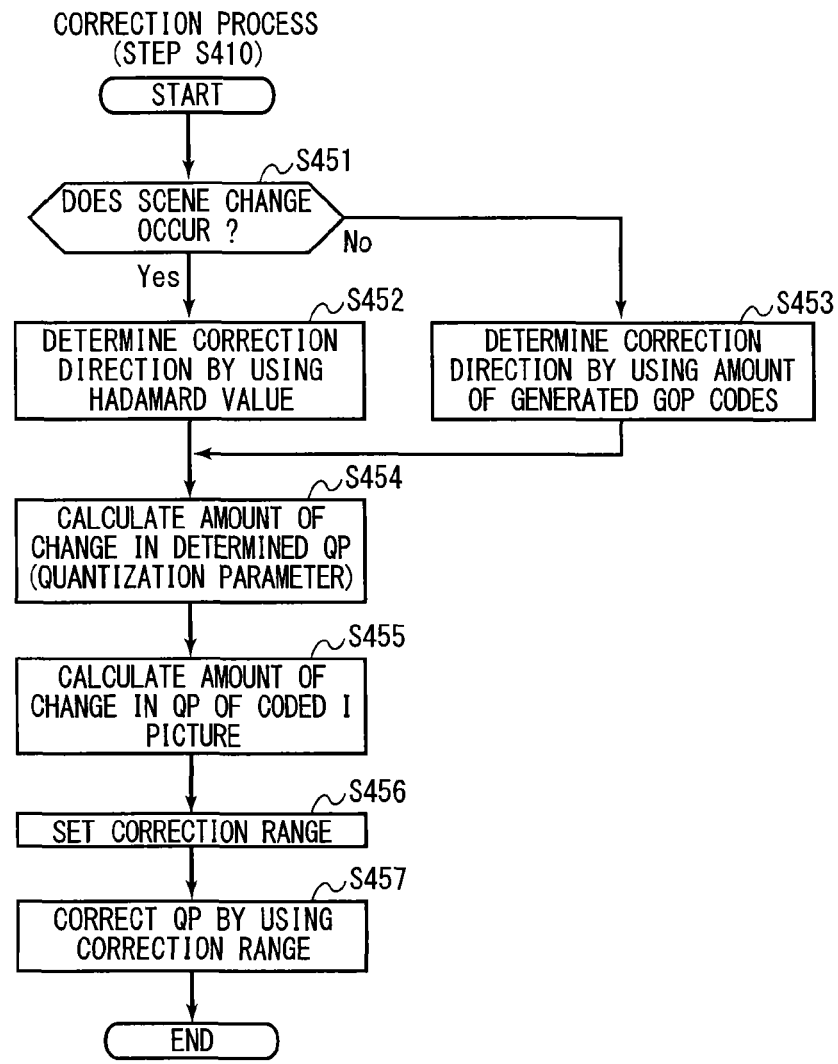
FIG. 10 is a flowchart of a correction process of a quantization parameter shown in FIGS. 6 and 9.
Figure 11:
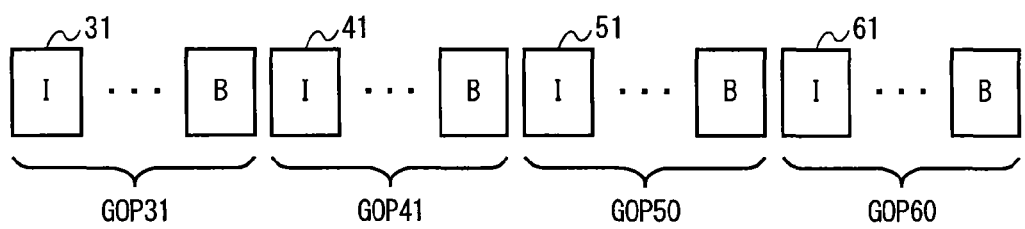
FIG. 11 is a view showing a structure of the H.264 data shown in FIG. 1.

FIG. 10 is a flowchart of a correction process of a quantization parameter (Step S410). FIG. 11 is a view showing an arrangement of GOPs constituting the H.264 data 29. Hereinafter, with reference to FIGS. 10 and 11, Step S410 will be discussed in detail, taking a case, as an example, where a leading picture (I picture 61) of a GOP 60 is a current picture.

Figure 12:
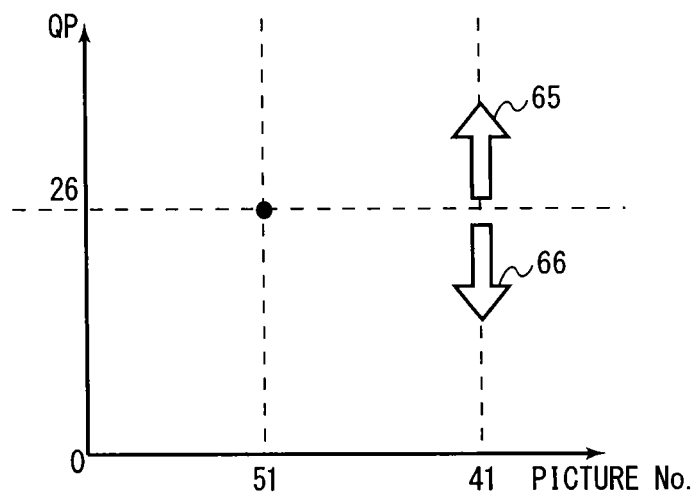
FIG. 12 is a view showing a correction direction set in the correction process shown in FIG. 10.

When a scene change occurs and the quantization parameter 24 of the I picture 61 is determined ("Yes" in Step S451), the quantization parameter determination unit 13 sets a correction direction by using the Hadamard value 23 of the I picture 61 (Step S452). The correction direction is a parameter indicating whether the quantization parameter 24 of the I picture 61 which is determined in Step S403 or S409 should be increased or decreased with the quantization parameter 24 of a coded I picture 51 as a reference. FIG. 12 is a view showing a correction direction of the quantization parameter 24 of the I picture 61. In FIG. 12, the horizontal axis represents a number of each picture and the reference sign of the picture is used conveniently as a value of the horizontal axis.

In Step S452, the quantization parameter determination unit 13 specifies the coded I picture 51 which is closest to the I picture 61. Specifically, the quantization parameter determination unit 13 specifies the GOP 50 which is coded immediately before the GOP 60 including the I picture 61 and further specifies the I picture 51 as the leading picture of the GOP 50.

When the Hadamard value 23 of the I picture 61 is larger than the Hadamard value 23 of the I picture 51, the quantization parameter determination unit 13 determines that the complexity increases from the I picture 51 to the I picture 61 and then determines an upward direction (the direction indicated by an arrow 65) as the correction direction. The quantization parameter 24 of the I picture 61 is so corrected as to be not smaller than the quantization parameter 24 of the I picture 51. Further, the quantization parameter 24 of the I picture 61 is not corrected in Step S452 but corrected in Step S456 discussed later.

On the other hand, when the Hadamard value 23 of the I picture 61 is smaller than the Hadamard value 23 of the I picture 51, the quantization parameter determination unit 13 determines that the complexity decreases and then determines a downward direction (the direction indicated by an arrow 66) as the correction direction. The quantization parameter 24 of the I picture 61 is so corrected as to be not larger than the quantization parameter 24 of the I picture 51.

Back to the discussion of Step S451, when the code amount differential value is larger than the selection reference value, in the case where the quantization parameter 24 of the I picture 61 is determined ("No" in Step S451), the quantization parameter determination unit 13 determines the correction direction by using the amount of generated GOP codes (Step S453). In other words, Step S453 is executed when the quantization parameter of the current picture is determined in the processes of Steps S404 to S409 shown in FIG. 6 or FIG. 9.

In Step S453, the quantization parameter determination unit 13 specifies the coded GOP (GOP 50) which is closest to the I picture 61. When the amount of generated codes in the GOP 50 is not larger than the ideal amount of GOP codes, the quantization parameter determination unit 13 determines the upward direction (the direction indicated by an arrow 65) as the correction direction in order to increase the amount of codes. On the other hand, when the amount of generated codes in the GOP 50 is larger than the ideal amount of GOP codes, the quantization parameter determination unit 13 determines the downward direction (the direction indicated by an arrow 66) as the correction direction in order to reduce the amount of codes.

Figure 13:
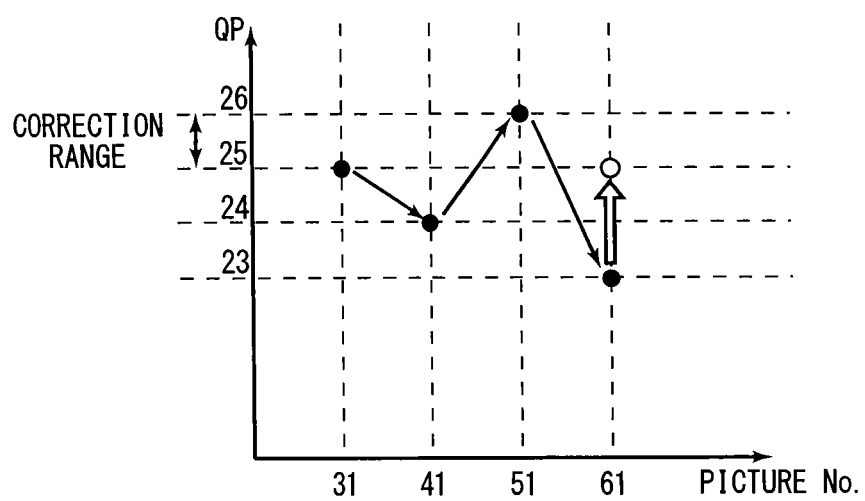
FIG. 13 is a view showing a change of a quantization parameter of the H.264 data shown in FIG. 1.

Next, the quantization parameter determination unit 13 executes Steps S454 and S455. FIG. 13 is a view showing a change of the quantization parameter 24. In FIG. 13, the horizontal axis represents a number of a picture and the reference sign of the I picture is conveniently used. Hereinafter, Steps S454 and S455 will be discussed, taking a case, as an example, where the quantization parameters 24 of I pictures 31, 41, and 51 are "25", "24", and "26", respectively and the quantization parameter 24 of the I picture 61 (current picture) is determined to be "23".

The quantization parameter determination unit 13 calculates the amount of change in the quantization parameter 24 of the I picture 61 (Step S454). Specifically, the quantization parameter determination unit 13 calculates a differential absolute value between the quantization parameter 24 of the I picture 61 and the quantization parameter 24 of the leading picture (I picture 51) of the coded GOP 50 which is closest to the I picture 61.

The quantization parameter determination unit 13 calculates an absolute value of the amount of change in the quantization parameter 24 of the coded I picture (Step S455). Specifically, the quantization parameter determination unit 13 specifies two leading pictures 51 and 41 of the coded GOPs with the I picture 61 as a reference. The quantization parameter determination unit 13 calculates the differential absolute value between the quantization parameter 24 of the I picture 51 and the quantization parameter 24 of the I picture 41. The quantization parameter determination unit 13 further calculates the differential absolute value between the quantization parameter 24 of the I picture 41 and the quantization parameter 24 of the I picture 31.

The quantization parameter determination unit 13 sets a correction range so that a total value of the differential absolute value calculated in Step S454 and all the differential absolute values calculated in Step S455 may be not larger than a predetermined upper limit value (Step S456). The total value is expressed by the following Eq. 4.

$$S = |QP - \text{Prev}QP1| + |\text{Prev}QP1 - \text{Prev}QP2| + |\text{Prev}QP2 - \text{Prev}QP3| \quad \text{(Eq. 4)}$$

In Eq. 4, "S" represents the total value, "QP" represents the quantization parameter 24 of the I picture 61 (current picture), and "PrevQP1", "PrevQP2", and "PrevQP3" represent the quantization parameters 24 of the I pictures 51, 41, and 31, respectively.

With reference to Eq. 4 and FIG. 13, detailed discussion will be made on setting of the correction range. It is assumed, herein, that the upper limit change value is set to be 4 and the correction direction is determined to be a downward direction in Steps S451 to S453. Since the quantization parameters 24 of the I pictures 51 and 41 are "26" and "24", respectively, |PrevQP1−PrevQP2| is 2. Since the quantization parameters 24 of the I pictures 41 and 31 are "24" and "25", respectively, |PrevQP2−PrevQP3| is 1. Therefore, in order to make the total value S not larger than the upper limit change value of "4", the quantization parameter determination unit 13 has to make |PrevQP1−PrevQP2| not larger than "1".

The correction direction is the downward direction and the quantization parameter of the I picture 51 (PrevQP1) is "26". Therefore, as shown in FIG. 13, the quantization parameter determination unit 13 sets the correction range of the quantization parameter 24 of the I picture 61 to be in a range from "25" to "26" (Step S456).

Next, the quantization parameter determination unit 13 corrects the quantization parameter 24 of the I picture 61 determined in Step S403 or S409 (see FIG. 9) so as to fall within the set correction range (Step S457). As shown in FIG. 13, when the quantization parameter 24 of the I picture 61 is "23", the quantization parameter determination unit 13 corrects the quantization parameter 24 of the I picture 61 to be "25". When the quantization parameter 24 of the I picture 61 is determined to be a value larger than "26", the quantization parameter determination unit 13 corrects the quantization parameter 24 of the I picture 61 to be "26".

Thus, the quantization parameter determination unit 13 corrects the quantization parameter of the current picture so that the total value of the differential absolute values calculated in Steps S454 and S455 may not be larger than a predetermined upper limit value. As a result, it is possible to reduce the amplitude of the oscillation of the quantization parameter (repeated increase and decrease of the quantization parameter). Since repeated occurrence of increase in the image quality and degradation in the image quality can be prevented, it is possible to prevent the image quality of the H.264 data 29 from totally degrading.

When a scene change occurs ("Yes" in Step S451), the quantization parameter determination unit 13 may omit Step S455. In this case, the quantization parameter determination unit 13 sets the correction range so that |QP−PrevQP1| may not be larger than the upper limit change value. Since the correction range can be set to be larger as compared with a case where the correction range is set by using a cumulative value of Step S455, it is possible to determine the quantization parameter of the picture after the occurrence of a scene change in a relatively free manner. In this case, the upper limit change value may be different from the upper limit change value used in execution of Step S455.

In the above-discussed preferred embodiments, the Hadamard transform unit 11 may perform vertical Hadamard transform besides horizontal Hadamard transform, to thereby calculate the Hadamard value. Since the Hadamard value including frequency components in the horizontal and vertical directions can be obtained, it is possible to increase the detection accuracy of the scene change and the accuracy of the code amount control. Further, the Hadamard transform unit 11 may perform only vertical Hadamard transform.

In the above-discussed preferred embodiments, the case has been discussed, where the code amount calculation unit 131 calculates the target amount of GOP codes by using the ideal amount of GOP codes, the total error, and the time period error. The code amount calculation unit 131, however, may calculate the target amount of GOP codes by using only the ideal amount of GOP codes and the total error. Alternatively, the code amount calculation unit 131 may calculate the target amount of GOP codes by using only the ideal amount of GOP codes and the time period error. It is thereby possible to further suppress the amount of computation in the coding of the uncompressed image data 21.

Further, in the above-discussed preferred embodiments, the case has been discussed, where the amount of codes is controlled on a GOP-by-GOP basis by determining the quantization parameter of the current picture on the basis of the Hadamard value 23 and the target amount of picture codes when the current picture is an I picture. The image coding apparatus 1, however, may control the amount of codes in units of groups each constituted of a plurality of pictures, each of which is different from the GOP, instead of controlling the amount of codes on a GOP-by-GOP basis. For example, the image coding apparatus 1 may control the amount of codes in units of two or more continuous GOPs or in units of groups each constituted of pictures smaller in number than those of a GOP.

In this case, it is preferable that the leading picture should be an I picture in a group of pictures as a unit of code amount control. In Step S31 (see FIG. 5), the scene change determination unit 12 determines a leading picture of a group which is closest to the current picture as the picture for comparison.

In Step S402 (see FIG. 6 or FIG. 9), the code amount calculation unit 131 may calculate the target amount of picture codes by multiplying the ideal amount of group codes by the leading picture ratio. The leading picture ratio can be obtained by calculating a ratio of the amount of generated codes in the leading picture to the amount of generated codes in the group which is coded immediately before. In Step S404 (see FIG. 6 or FIG. 9), the quantization parameter determination unit 13 may determine whether the current picture is a leading picture of the unit of code amount control or not.

In Steps S454 and S455 (in FIG. 10), the quantization parameter determination unit 13 may calculate the differential absolute value by using the current picture (I picture 61) and the leading picture of the group, instead of the I pictures 51, 41, and 61.

While the invention has been shown and described in detail, the foregoing description is in all aspects illustrative and not restrictive. It is therefore understood that numerous modifications and variations can be devised without departing from the scope of the invention.

The invention claimed is:

1. An image coding apparatus for coding uncompressed image data on a picture-by-picture basis, comprising:
   a Hadamard transform unit configured to calculate a Hadamard value of a first picture by performing Hadamard transform on said first picture to generate frequency component data and summing absolute values of AC component values included in said frequency component data; and
   a scene change determination unit configured to determine whether a scene change has occurred in said first picture based on a difference between the Hadamard value of said first picture and a Hadamard value of a picture that is coded prior to the first picture.

2. The image coding apparatus according to claim 1, wherein
   said Hadamard transform unit performs the Hadamard transform on said first picture in units of a predetermined number of pixels arranged in a horizontal direction.

3. The image coding apparatus according to claim 1, further comprising:
   a code amount calculation unit configured to calculate target amount of picture codes which is a target value of the amount of codes to be generated by coding the first picture;
   a first quantization parameter determination unit configured to determine a quantization parameter to be used for coding of said first picture on the basis of said Hadamard value and said target amount of picture codes; and
   a coding unit configured to code said first picture by using said quantization parameter.

4. The image coding apparatus according to claim 3, wherein
   said code amount calculation unit calculates the ideal amount of group codes which is an ideal value of the amount of codes in an image group constituted of a plurality of pictures on the basis of a target bit rate which is set in advance,
   said image coding apparatus further comprising:
   a second quantization parameter determination unit configured to determine a quantization parameter of a coded leading picture which is positioned at the beginning of an image group and closest to said first picture, to be used as a quantization parameter of said first picture; and
   a determination method selection unit configured to select either one of said first quantization parameter determination unit and said second quantization parameter determination unit on the basis of said ideal amount of group codes and the amount of generated codes in an image group which is coded immediately before an image group including said first picture.

5. The image coding apparatus according to claim 4, wherein said determination method selection unit selects said first quantization parameter determination unit when the scene change determination unit determines that a scene change occurs in said first picture.

6. The image coding apparatus according to claim 4, wherein
said determination method selection unit selects either one of said first quantization parameter determination unit and said second quantization parameter determination unit when said first picture is a leading picture of said image group.

7. The image coding apparatus according to claim 4, further comprising:
a total error calculation unit configured to obtain an individual error by subtracting said ideal amount of group codes from the amount of generated codes in a coded image group and configured to obtain a total error by summing individual errors in all coded image groups,
wherein said code amount calculation unit calculates said target amount of picture codes on the basis of said ideal amount of group codes and said total error.

8. The image coding apparatus according to claim 4, further comprising:
a period error calculation unit configured to obtain an individual error by subtracting said ideal amount of group codes from the amount of generated codes in a coded image group and configured to calculate a time period error by summing individual errors in a predetermined number of coded image groups starting from said image group including said picture,
wherein said code amount calculation unit calculates said target amount of picture codes on the basis of said ideal amount of group codes and said time period error.

9. The image coding apparatus according to claim 3, further comprising:
a first difference calculation unit configured to calculate a first differential absolute value between a quantization parameter of said first picture and a quantization parameter of a first leading picture, said first leading picture being a coded leading picture which is closest to said first picture among leading pictures of image groups each of which is constituted of a plurality of pictures;
a second difference calculation unit configured to calculate a second differential absolute value between a quantization parameter of each of second leading pictures and a quantization parameter of a coded leading picture positioned immediately before said each of said second leading pictures, said second leading pictures being a predetermined number of coded leading pictures starting from said first picture; and
a correction unit configured to correct said quantization parameter of said first picture so that a total value of said first differential absolute value and all second differential absolute values is not larger than a predetermined value.

10. The image coding apparatus according to claim 9, wherein
said correction unit determines whether said quantization parameter of said first picture should be corrected to a value smaller than said quantization parameter of said first leading picture or to a value larger than said quantization parameter of said first leading picture on the basis of the ideal amount of group codes which is an ideal value of the amount of codes in an image group and the amount of generated codes in an image group which is coded immediately before an image group including said first picture.

11. The image coding apparatus according to claim 9, wherein said correction unit determines whether said quantization parameter of said first picture should be corrected to a value smaller than said quantization parameter of said first leading picture or to a value larger than said quantization parameter of said first leading picture on the basis of said Hadamard value of said first picture and a Hadamard value of said first leading picture when it is determined that a scene change occurs in said first picture.

12. The image coding apparatus according to claim 1, wherein:
said scene change determination unit determines that the scene change occurs in said first picture when a differential absolute value between said Hadamard value of said first picture and a Hadamard value of a coded leading picture which is closest to said first picture among leading pictures of image groups each of which is constituted of a plurality of pictures is larger than a first threshold value.

13. The image coding apparatus according to claim 12, further comprising:
a code amount calculation unit configured to set the ideal amount of group codes which is an ideal value of the amount of codes in said image group which is constituted of a plurality of pictures on the basis of a target bit rate which is set in advance,
wherein said scene change determination unit determines that the scene change occurs in said first picture when said first picture is a leading picture in an image group and a differential absolute value between said ideal amount of group codes and the amount of generated codes in an image group which is coded immediately before said image group including said first picture is larger than a second threshold value.

14. The image coding apparatus according to claim 1, wherein the Hadamard transform unit is configured to calculate the Hadamard value of the first picture independently of a coding unit configured to code said first picture.

15. An image coding apparatus for coding uncompressed image data on a picture-by-picture basis, comprising:
circuitry configured to
calculate a Hadamard value of a first picture by performing Hadamard transform on said first picture to generate frequency component data and summing absolute values of AC component values included in said frequency component data; and
determine whether a scene change has occurred in said first picture based on a difference between the Hadamard value of said first picture and a Hadamard value of a picture that is coded prior to the first picture.

* * * * *